Patented July 26, 1938

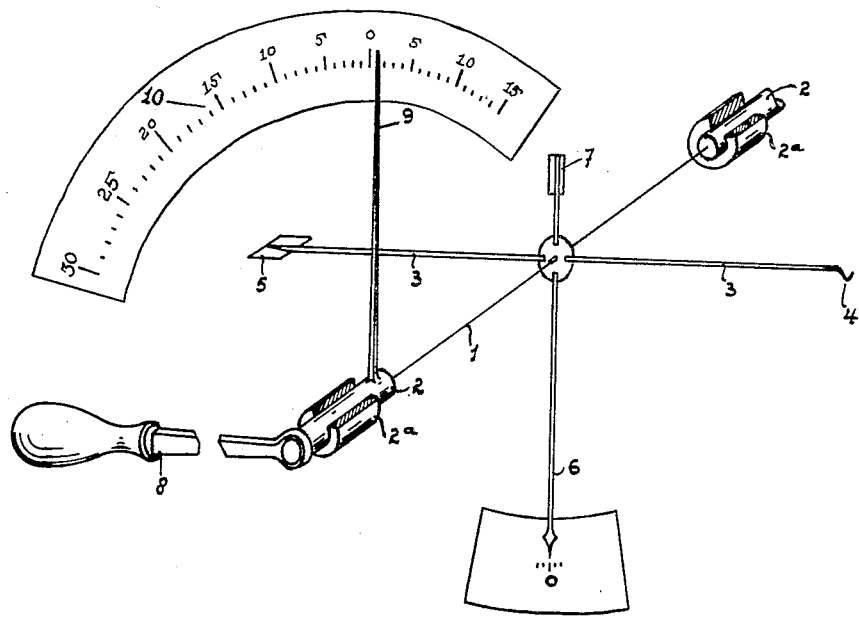

2,124,968

UNITED STATES PATENT OFFICE 2,124,968

TORSION BALANCE

Emil Adolf Ahrndt and Hermanus Wilhelmus Söndagh, Nijmegen, Netherlands, assignors to Naamlooze Vennootschap Vereenigde Draadfabrieken, Nijmegen, Netherlands Application May 29, 1935, Serial No. 24,014
In the Netherlands May 30, 1934

4 Claims. (Cl. 265—59)

This invention relates to torsion balances, and more particularly to balances of the type in which the balance beam, loaded with the article to be weighed, is brought into the zero position by twisting a body, and in which the degree of twisting or torsion of said body indicates the weight of the article to be weighed. This torsion, or the indicated weight respectively, may be read from a scale provided with congruent divisions.

The known balances of this type, which are usually applied for very small measuring ranges either are not sufficiently sensitive or they are, in order to obtain the required sensitiveness, very complicated. Hence they are expensive and moreover only suitable for use in laboratories but not adapted for continuous use in factories. According to the invention a torsion balance is obtained which is extremely sensitive and moreover very simple of design. The risk of breakdowns is reduced to a minimum and the cost price is reduced within reasonable limits. The balance is not only suitable for use in laboratories but for use in factories as well.

According to the invention these features are obtained in such a way that the shaft on which the balance beam is supported serves as a torsion body at the same time.

The balance or torsion shaft of the apparatus according to the invention may consist of a strap, a wire, rod, or a plurality of the same, etc., preferably made of a material having a high limit of elasticity, as tungsten, molybdenum, steel and like materials which have proved to give very satisfactory results. The torsion shaft however needs not to consist of metal but may be made of fibers, silk, gutstring, textile threads, etc.

In order that the invention may be clearly understood it will now be described with reference to the accompanying drawing, which diagrammatically shows construction of a torsion balance made in accordance with the invention.

The torsion shaft 1, preferably consisting of a tungsten wire, is held at its ends in clamps 2 which are located in bearings 2a provided in the frame of the instrument (not shown). The balance beam 3 is secured on the torsion shaft and is provided at one end with a hook 4 or the like for carrying the article to be weighed and at its other end with a thin, light plate 5 having a large surface perpendicular to the direction of movement, serving for damping the oscillations of the balance beam. Perpendicular to the balance beam a zero pointer 6 is provided, which is balanced by a counterweight 7. On the front clamp 2 a pointer 9 is attached, which may be turned in the bearing 2a, together with the clamp 2, by means of the handle 8, whereby the pointer is moved along the scale division 10. The rear clamp 2 may also be rotatably mounted in the corresponding bearing 2a, thus serving as a zero correction that is to say by means of said clamp the pointer 6 may be adjusted on the zero point when the balance beam is released from this clamp.

The balance as illustrated works as follows: When the hook 4 is loaded with the article to be weighed, the shaft 1 is twisted, the hook sags and the pointer 6 leaves the zero point to which it was adjusted before the balance beam was loaded. By means of the handle 8 the torsion shaft is twisted to such a degree that the pointer 6 is brought to the zero point. The deflection of the pointer 9 thus obtained accurately indicates the weight on the scale 10.

Preferably the scale divisions are provided over about 180° to 250°. As by the choice of the material to be used for the torsion shaft, and of its length and cross section it is possible to twist the shaft by more than 360° without exceeding its limit of elasticity, the pointer 6 returns to the zero point if the pointer 9 is brought back to the zero point, the hook being unloaded.

It is easily possible to make the torsion shaft of such dimensions that a deflection of the pointer 9 by 180° corresponds to a weight of 0.5 milligram so that very accurately weighing is obtained.

Notwithstanding the great precision, a reading may take place in a considerably shorter time than with a lever or beam balance of corresponding fineness, whereas the balance herein disclosed has the advantage of greater accuracy and simpler construction as compared with torsion balances known in the prior art.

It is to be noted that the invention has the advantage of being entirely free from mechanical friction which might interfere with the sensitiveness of the balance.

Whereas a certain embodiment of the invention has been described and illustrated, it is to be understood that modifications and changes in structure may be made without departing from the spirit of the invention as defined in the subjoined claims.

What is claimed is:

1. An apparatus for indicating the weight of an article by the degree of torsion occurring in a torsion body by the articles being weighed, said apparatus comprising in combination, a pair of clamps, one of said clamps being rotatable, means for rotating said clamp, a straight shaft of small cross section constituting the torsion body having its extremities directly secured in and to said clamps, a balanced rigid balance beam fixedly supported between the ends thereof upon said torsion body between the ends of the latter, said beam being adapted to be loaded at one end with the article to be weighed, means rigid with said balance beam indicating the zero position of the latter in unloaded condition, and means indicating the degree of torsion of the torsion body after returning the loaded balance beam to the zero position.

2. An apparatus for indicating the weight of an article by the degree of torsion occurring in a torsion body by the articles being weighed, said apparatus comprising, in combination, a pair of rotatably mounted spaced clamps, a straight shaft of small cross section constituting the torsion body which is directly fixed at its ends in and to said clamps, a balanced rigid balance beam secured between the ends thereof upon said torsion body between the extremities of the latter and provided at one end with means to support the article to be weighed, means for rotating said clamps, means to fix one clamp independently of the other, means fixed to said balance beam to indicate the degree of torsion of the torsion body or the degree of rotation of the rotatable clamp with respect to the fixed clamp after returning the loaded balance beam to the zero position.

3. A torsion weighing scale comprising in combination, a pair of fixed spaced bearings, clamps rotatable therein, a straight torsion wire fixed axially at its respective ends directly to said clamps, a beam secured between its ends to said wire between the ends of the same wire, there being article supporting means at one end of said beam and a thin flat horizontally disposed plate at the opposite end, means on one of said clamps for rotating the same in either direction, an index finger fixed on the same clamp, an index scale graduated in terms of weight over which said finger may be moved, a balanced pointer fixed on said beam, and a zero indicator for the last named pointer.

4. A torsion weighing scale comprising in combination, a pair of alined bearings fixed in spaced relation, cylindrical clamps rotatable in said bearings, a straight torsion wire fixed at its ends in said clamps, a balanced beam rigidly secured between the ends thereof to said wire between the ends of the latter, said beam having an article receiving means at one end and a gravity counterpoise at the other, a balanced vertical pointer carried by said beam, a stationary zero indicator therefor, an accurate index scale graduated to read in terms of weight, a second pointer fixed to one of said clamps to move relative to said index, and manual means secured to said pointer carrying clamp for rotating the same and bringing the first named pointer into registration with the zero position on said indicator, when the second named pointer indicates the weight of an article on said beam upon said index.

EMIL ADOLF AHRNDT.
HERMANUS WILHELMUS SÖNDAGH.